B. HAUSHEER.
CAN MANIPULATING MACHINE.
APPLICATION FILED MAY 14, 1912.
1,091,838.
Patented Mar. 31, 1914.
2 SHEETS—SHEET 1.
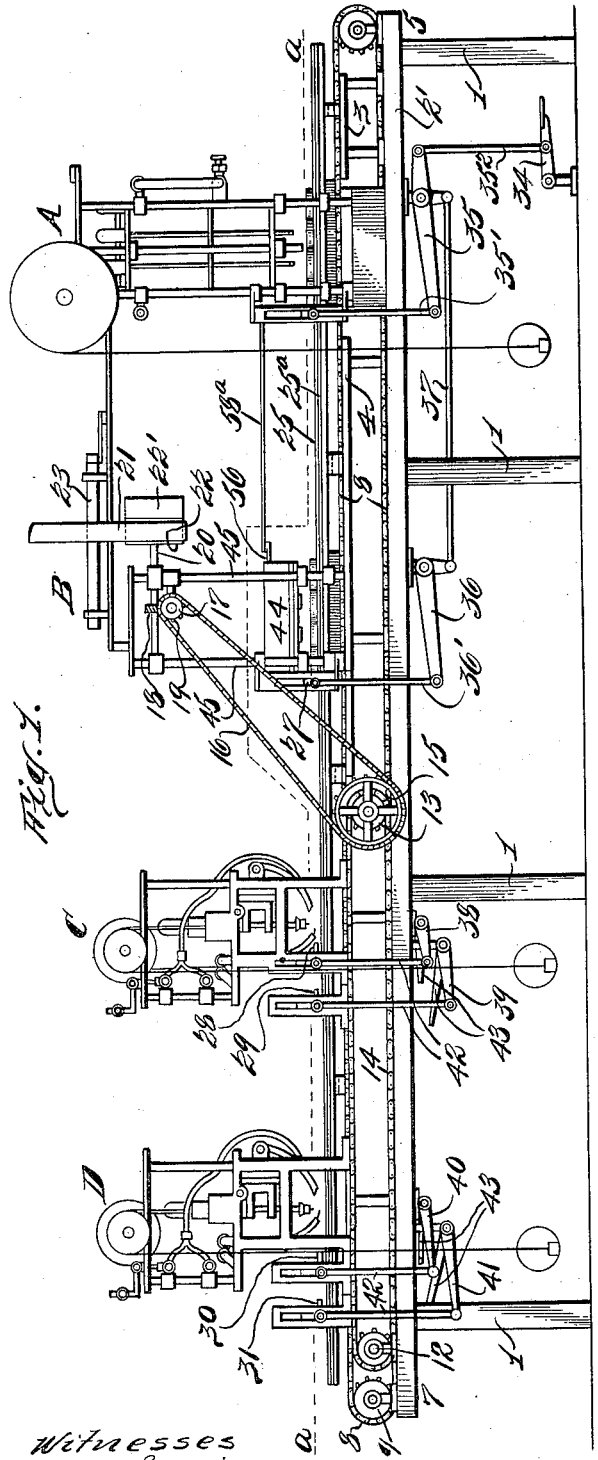
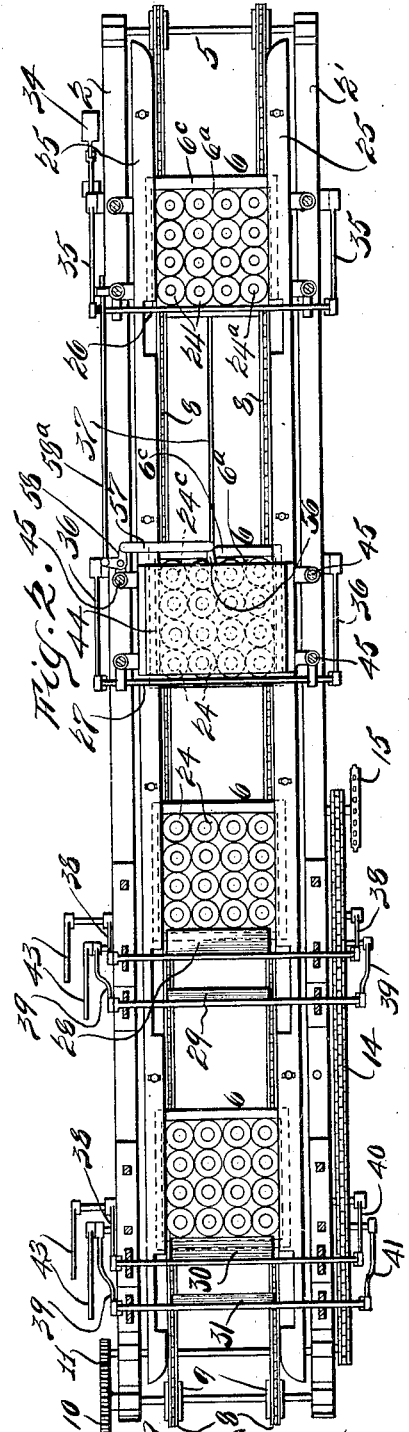

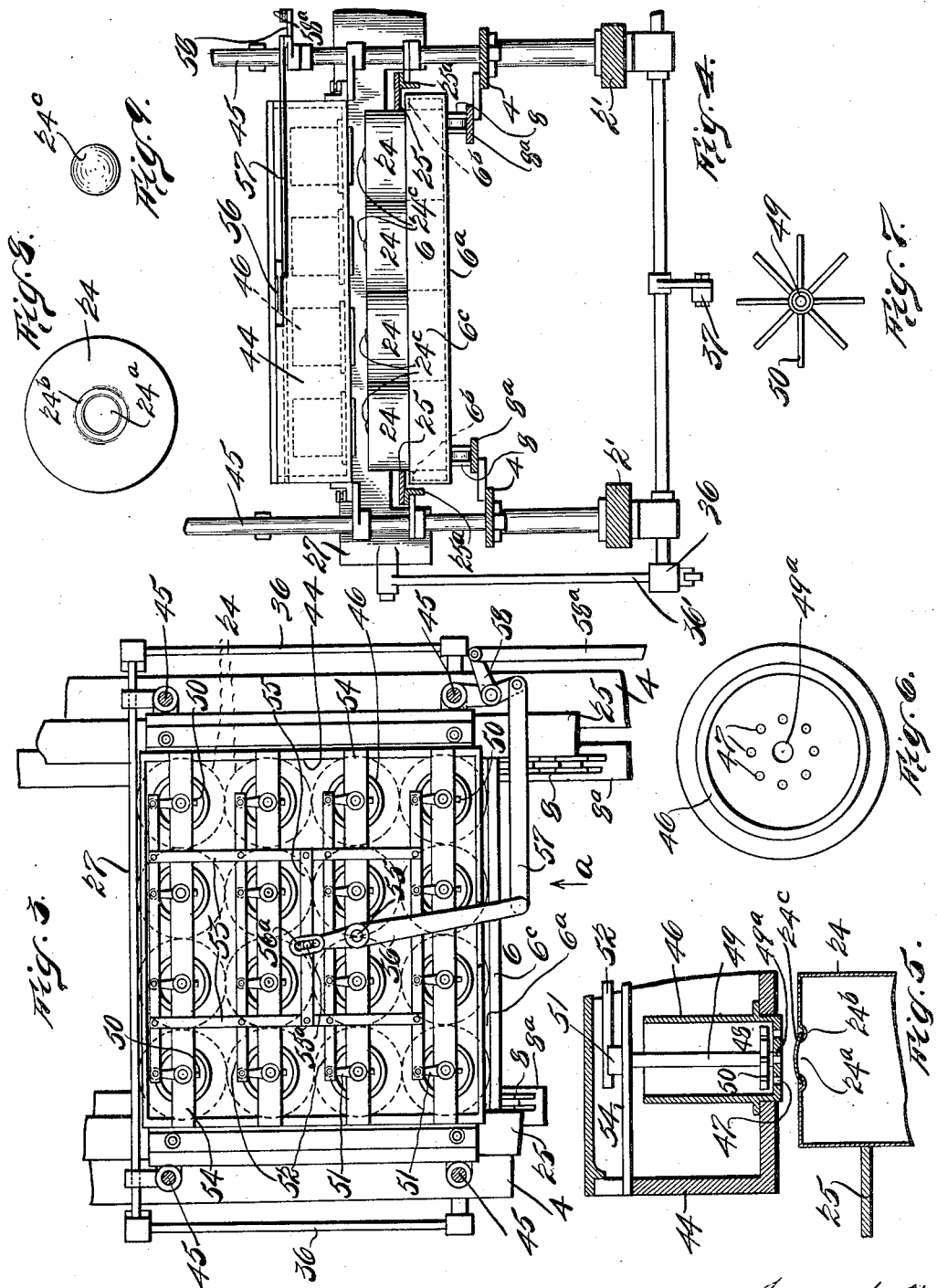

UNITED STATES PATENT OFFICE.

BERNARD HAUSHEER, OF NORWICH, NEW YORK, ASSIGNOR TO BORDEN'S CONDENSED MILK COMPANY, OF NEW YORK, N. Y., A CORPORATION OF NEW JERSEY.

CAN-MANIPULATING MACHINE.

1,091,838.  Specification of Letters Patent.  Patented Mar. 31, 1914.

Original application filed June 28, 1910, Serial No. 569,270. Divided and this application filed May 14, 1912. Serial No. 697,138.

*To all whom it may concern:*

Be it known that I, BERNARD HAUSHEER, a citizen of the United States, and a resident of Norwich, in the county of Chenango and State of New York, have invented a new and useful Can-Manipulating Machine, of which the following is a specification, my present application being a division of my copending application, Serial No. 569,270, filed June 28, 1910.

My present invention relates to improvements in machines for manipulating simultaneously, and alike, pluralities, or groups, of like cans, or other cylindrical containers of merchandise, such for example as condensed milk.

In my said co-pending application I have disclosed, and claimed, means whereby, without handling, the said groups of containers may be fed, simultaneously when desired, through the machine, beneath a plurality of sequentially disposed differently-functioning groups of alike operating devices, for example respectively cap-placing, flux applying, and soldering devices, also means whereby, by aid of said feeding means, each member of one of said groups of containers may be centered accurately with a member of one of said groups of operating devices and different groups so centered simultaneously when desired, also means whereby said containers may, by aid of said feeding means, be held so centered during function thereon of the operating devices with which they are then centered.

The said means are here shown and described to the extent required for complete understanding of my present invention, the principal objects of which comprise provision of means whereby the said groups of containers so fed, centered and held may be also manipulated, or treated, by application to the members thereof simultaneously of flux where required for subsequent soldering, and this with precision, with comparatively small, if any, superfluity or waste of the flux, and without manually handling the flux, the flux receptacles, or the cans. I attain my said objects by the devices and combinations of devices hereinafter more particularly described and claimed, thereby economizing in time and in manual labor and also diminishing leaks owing to more accurate, uniform and complete application and distribution of sufficient solder to the localities where required to insure tight and perfect soldering.

My invention is illustrated by the accompanying drawings as described herein, together with such additional features as seem essential to impart such full, clear, and exact understanding thereof as to enable any person skilled in the art to construct and use the same to the best advantage.

Referring now to the drawings—Figure 1 is a side elevation of principal parts of an organized can-conveying and centering, and cap-applying, fluxing and soldering machine containing my present invention. Fig. 2 is a top, plan, view, partly in section, taken on line $a$—$a$ of Fig. 1, showing groups of cans held in positions centered for manipulation thereof by the groups of operating devices. Fig. 3 is a top, plan, view, on enlarged scale, of my fluxing devices with cover removed. Fig. 4 is an end view of the parts shown in Fig. 3, seen in the direction of the arrow $a$ in latter. Fig. 5 is a fragmentary detail, partly sectional, view on still larger scale of portions of the fluxing devices showing a flux container and flux agitating device, and, in central vertical section, part of a thereunder disposed can, and a cap. Fig. 6 is a top, plan, detail view on still larger scale of one of the flux containers showing its vents. Fig. 7 is a top, plan, detail, view, on same scale as Fig. 6, of one of my flux agitators. Fig. 8 is a top view of the can shown, partly, in section in Fig. 5. Fig. 9 is a top view of the cap shown in section in Fig. 5.

The machine as shown in its entirety in Figs. 1 and 2 is supported by a suitable frame comprising legs 1, horizontally longitudinally extending supporting members 2, 2', and, mounted on latter, auxiliary supporting elements 3, 4. Adjacent the front, or receiving, end 5 of the machine are, as indicated in Fig. 1, disposed a group of similarly constructed and operating, like, cap-placing devices and instrumentalities indicated by A, the function of which is, as fully described in my said co-pending application, to automatically place a cap positioned for soldering onto the opening of each of said group of cans. A convenient distance behind these cap-placing instrumentalities is disposed in the machine as shown a group of similarly constructed and operating, like, flux-applying instrumentalities indicated by B, these being more particularly the subject of my present application; and, behind these again groups of like soldering instrumentalities indicated by C and D, the construction and operation of which require here no further description than that they function to supply solder to the as aforesaid previously flux-supplied portions of the caps and cans, and melt and iron such solder in and adjacent the joint to form the seam.

The machine has, extending longitudinally therethrough, a runway for the cans, bounded laterally, on each side, by parallel, lateral, alining members and below by the endless conveyer hereinafter described, coöperating with which and with other elements as hereinafter described are movable trays or carriers 6 (Fig. 2) comprising a bottom 6ª (Figs. 2 and 4), side flanges 6ᵇ, and a transverse tail-board, or rear member, 6ᶜ (Figs. 2 and 4) for a specific purpose hereinafter described; said carrier, as a whole, being dimensioned and adapted to carry loosely thereon a group of similarly shaped, or like, cylindrical containers, in this instance cans, i. e. the capacity of said carrier is somewhat greater than the number of cans contained as indicated in part by dotted lines (Figs. 2 and 4), thus admitting some movement of the cans on the bottom of said carrier relatively thereto and to each other. The said endless conveyer consists, in this instance, of the sprocket-chains 8, movably supported on underneath ways 8ª. Means are provided to impart to said conveyer continuous motion in parallelism with said run-way, i. e. the chains 8 are driven by sprocket-wheel 9, located at delivery end 7 of the machine, Sprocket-wheel 9 is rotated by gear 10 (Figs. 1 and 2), intermeshed with pinion 11, rotated by sprocket-wheel 12, rotated by another sprocket wheel 13, through sprocket-chain 14. Wheel 13 is rotated by sprocket-wheel 15 through chain 16 and sprocket-pinion 17. Pinion 17 is rotated by spiral-gears 18, 19; 18 being carried by shaft 20 rotated by belt 21 and pulley 22. Belt 21 may be moved from pulley 22 to idler pulley 22′ and vice versa by belt-shifter 23 under control of an operator stationed near cap-placing devices A. The cans, 24, constitute, in this instance, a group containing an even number, sixteen, of cylindrical cans, of like shape and dimension, as shown in the drawings (Fig. 2). The top of each can comprises the usual circular therewith concentric and, at this stage, uncapped opening 24ª, the edge of which is flanged as at 24ᵇ (Figs. 5 and 8), to receive, and seam with, the circular cap 24ᶜ thereto applied in position as shown in Fig. 5 by the aforesaid cap-placing instrumentalities.

It will be understood that the said cans have, prior to entering the machine, been filled with merchandise, for instance condensed milk, requiring for its preservation hermetic sealing. The aforesaid can-carriers 6 loosely ride on the chains 8 constituting the endless conveyer, i. e. are supported and held thereon by gravity and friction only.

Laterally bounding the can-runway are parallel, alining, members, or rails, 25 (Figs. 2 and 4), mounted upon angle-irons 25ª supported on elements 3, 4, etc., of the frame of the machine. Said lateral members are supported, and disposed, sufficiently above the conveyer chains 8 to clear the carriers 6, and sufficiently proximate to the center of said runway to contact with some of the group of cans on the bottom or floor of said carrier. Said lateral, alining, members are spaced-apart a distance equal to the sum of the diameters of an aliquot number of said even-numbered group of like cans (Figs. 2 and 4), thus permitting some of the cans to be advanced and held abreast of each other in the runway. The centers of the operating devices constituting each of said groups A, B, C, D, are mutually spaced-apart a distance equal to the diameter of each of said cans, and the interspace between inner faces of said lateral members and vertical axes of said centers thereto most proximate is equal to one-half of said diameter, as witness the cans and flux-appliers (Figs. 4 and 5). It follows that the said lateral alining members will, as the cans are carried through the runway, contact with some cans and, co-acting with said conveyer, guide the group toward positions in which their centers will register with said centers of said operating devices, including said fluxing devices. Transverse said runway of the machine in the path of said cans are a plurality of movable, normally closed, stops, 26, 27, 28, 29, 30 and 31, sequentially disposed, as shown, to, in turn, contact with some of said cans and, coacting with said conveyer and said lateral members, crowd said group into positions, in equal ranks, in which centers of said cans will register, in turn, with said centers of said operating devices. The said stops are kept normally closed by gravity in, and transverse, the upper part of the path of the cans in said runway, being however, like the said lateral alining members 25, located sufficiently above the conveyer chains 8 to clear, at all times, the tops of carriers 6. It follows that said stops contact with some of the cans and co-acting with said conveyer and with said alining members tend to crowd the cans contacted, and thus more or less the entire group, into the aforesaid positions in which their centers will register with the said centers and axes of said operating devices.

After the stops have, as aforesaid, contacted with some of the cans, thereby checking the onward feed, or progression, of these through the runway, the aforesaid rear member 6ᶜ of carrier 6, disposed to contact with some of the cans, comes into play, and by so contacting therewith and coacting with said conveyer, said lateral alining members, and, in turn, with each of said stops ultimately forces said group of cans into the aforesaid required positions in which the center of each can is in exact register with the center of one of said operating devices, whereupon said rear member so co-acting combines to hold said group in said positions until the particular stop then in co-action therewith is raised out of its said normal position in the path of the cans in said runway. It follows that however irregularly the cans may be placed, or afterward disturbed, in the carriers, or on the conveyer, their progression through the machine operates to bring them in turn automatically, and inevitably, into required register with each successive group of operating, including the fluxing, devices, the cans being constantly guided laterally toward required positions by the lateral alining devices 25, intermittently crowded toward said positions by said stops, and ultimately forced thereinto, and held there, relatively to each plurality of operating devices, in turn, by said rear members 6ᶜ of the carriers 6. On the other hand it will be observed that no group of cans can at any time pass beyond its required position beneath any of said pluralities of operating devices until released through said raising of a stop; also that one or more groups of cans may be simultaneously advanced in the runway while one or more groups are simultaneously manipulated by one or more of said pluralities of operating devices, this being possible because of the continuous motion of the endless conveyer chains 8 on which the said carriers loosely ride, the chains constantly propelling each carrier until its cans are clamped stationary between one of said stops and said carrier's said rear member 6ᶜ, after which, and until said stop is lifted to open the path of the cans in the runway as hereinafter described, said chains will slip onward under the bottom of said carrier, the while, by their friction with latter, constantly imparting to said rear member 6ᶜ sufficient pressure against the therewith contacting cans to hold, through co-action of said alining members and said stop, the entire group of cans in required register with the then superimposed group of operating devices during manipulations by latter and until said stop is lifted. Any convenient means may be employed to so raise said stops as to open the runway for passage of the cans. In the present instance, the stop 26, adjacent the group A of cap-placing devices, and the stop 27 adjacent the group B of fluxing devices, are shown (Fig. 1) connected by suitable levers and links with treadle 34, depression of which by operator will obviously simultaneously lift both said stops, stop 26 being connected with bell crank lever 35 by link 35′, stop 27 being connected with bell crank lever 36 by link 36′, bell crank lever 36 being connected by link 37 with bell crank lever 35 and latter with treadle 34 by link 35². The stops 28, 29, 30 and 31 are raised by lever arms 38, 39, 40 and 41 respectively connected to their respective stops by links 42, said lever arms being in turn operated by handle-arms 43 within reach of the operator.

Referring now particularly to my novel fluxing devices, these comprise a frame, or box, 44 removably supported by pedestals 45 (Fig. 4) carried by said auxiliary supporting elements 4 resting on the frame members 2, 2′, and, supported by and extending through the bottom thereof as shown. Preferably within said box, are a plurality of like cylindrical flux-containers 46 (Figs. 3 and 4), each having, in its bottom, a number of equally spaced-apart downwardly delivering vents 47 disposed on a circle concentric with a point in said bottom, said point being, in this instance, the central vertical axis of said container. Said flux containers are equal in number to the group of cans to be simultaneously treated. The said points, or axes, of said containers 46 are equally spaced-apart a distance equal to the diameter of the cans to be supplied with flux, and the said vents are disposed preferably in circles, concentric with said points or axes, and dimensioned and located to correspond with the circular juncture, or seam, between a cap 24ᶜ and its can 24. See Fig. 5 and also Fig. 3 in which the location of the cans is indicated by dotted lines and Fig. 4 in which the locations of the flux containers are similarly indicated. The flux-containers are charged with any suitable flux, as for instance powdered resin, which the said vents 47 are disposed to deliver therethrough downwardly. Supported within each said flux-container is a rotatorily oscillatable flux-agitating member 48 comprising a vertically disposed shaft or spindle 49, in this instance having its lower end journaled in the bottom of the container end as at 49ᵃ and concentric with its said axis, and having radially projecting therefrom proximate said bottom of said container, arms 50 (Fig. 9) corresponding in number with, and disposed to simultaneously pass over, said vents at one stage in the rotation of said agitating member. Means are provided to impart partial rotation simultaneously to each of said agitating members 48.

Each said member is provided with a crank 51. Each of said cranks, normally disposed to radially project from its spindle in the same direction as the like cranks of the other spindles, is pivotally connected to a bar 52. Said bars 52 are pivotally connected together by other bars 53. The spindles 49 are, adjacent their upper ends, rotatably supported in brackets 54 carried by said frame or box 44. The bars 53 are connected together by a thereto pivotally secured link 55. One end of a lever 56 rotatably fulcrumed to one of the brackets 54 as at 55 (Fig. 3) is provided with a slot 56$^a$ within which plays a pin 55$^a$ carried by the link 55. The opposite end of lever 56 is by link 57 connected with one arm of bell-crank 58, the other arm of latter being connected to operating bar 58$^a$ within reach of the operator, said bell-crank being pivotally secured to a bracket carried by one of said pedestals 45 (Figs. 5 and 6). The vents 47 are of such small diameter that delivery of flux therethrough ceases from friction, except at such times as the flux within the containers is being agitated.

The operation of the fluxing devices is as follows: The group of cans upon which caps have been placed as hereinbefore described is caused, by the endless, continuously-moving, conveyer chains 8, to advance, abreast, through the runway of the machine after being released by the lifting of stop 26. The said group of cans is thus advanced until some of its members contact with the stop 27. Thereupon, through the hereinbefore described co-actions of said conveyer, said last mentioned stop, said rear member 6$^c$ of the carrier and said lateral alining members 25, the group is ultimately accurately positioned beneath said fluxing devices in equal ranks in which the center of the cap, of each can, registers with one of said points or axes of a flux-container, thus positioning the said joint between cap and can in required register with said vents. Thereupon the arm 58$^a$ is oscillated by the operator thereby causing the agitating devices 48 to partially rotate in each of their containers 46 and in the flux therein contained, which results in a sufficient quantity of said flux being simultaneously downwardly delivered through said vents to fall upon, or adjacent, the said joints, thus fitting them for subsequent soldering by the following instrumentalities for that purpose,—groups C and D. The stop 27 is then raised, thus again releasing the group of cans, which thereupon resumes its advance through the runway until contacted by stop 28 and once more marshaled and held stationary in equal ranks in positions in which their centers are equally spaced-apart and brought into register with the centers of said soldering instrumentalities by further co-action of the conveyer, the lateral alining members, the said stop, and the rear member of the carrier as hereinbefore described. My said flux-applying devices enable a single operator without handling the capped cans or the flux or flux containers to apply, to substantially only those parts of the can and cap requiring it for good soldering, substantially no more nor less than the amount of flux required and this substantially to all of such parts evenly and uniformly, also to so apply the flux to a considerable plurality of cans simultaneously whereby is effected superior soldering and desirable economy in flux and labor. In attaining these results of my invention the aforesaid plurality of equally spaced-apart flux vents disposed on a circle concentric, and registering, with that of the joint between cap and can, when latter is adjusted and held as aforesaid, is of importance, likewise the therewith concentrically disposed agitator provided with radially projecting arms equal in number to said vents and disposed so that each of said arms passes simultaneously over one of said vents when the agitator is oscillated. The radial disposition of the arms thus rotatorily oscillated tends to moxe flux not only in the direction of rotation but also transversely thereof, thus insuring a more thorough agitation and surer feed through the vents.

It will be understood that I do not confine myself to the particular shapes, proportions and relative locations of parts as illustrated in the drawings, these being variable, without departing from my invention, to meet special requirements of each type of containers treated; also the cylindrical flux containers 46 might be, though disadvantageously, dispensed with, the vents 47 being located as before but passing directly through the otherwise continuous bottom of the box, in which case the flux being charged as a whole into the box itself constituting the direct means for holding the flux, instead of in separate lots into the separate containers, is not so likely to maintain throughout such uniformity of level and condition as to secure the best and most uniform distribution of the flux through the vents. Also, the number and size of containers, treated simultaneously, may be varied as described by correspondingly varying the relative dimensions and locations of the aforesaid feeding, centering and holding devices, and the number, size and location of the flux agitating and delivering devices.

Having now described my invention, what I claim as new and desire to secure by Letters Patent is the following, viz:—

1. In a can-manipulating machine having a runway for the cans the combination of the following elements, viz: supported above said runway a plurality of like flux-containers having downwardly delivering vents adjacent a point in the bottom of each said container, the said points of said containers being equally spaced-apart; means to feed through said runway simultaneously as a group as many cans as there are containers; means to stop and hold said cans simultaneously beneath said containers; means to adjust said cans in positions in which the center of each registers with one of said points in said containers and means to feed flux from said containers simultaneously upon said cans.

2. In a can manipulating machine having a runway for the cans the combination of the following elements, viz: supported above said runway a plurality of like flux-containers having downwardly delivering vents adjacent a point in the bottom of each said container, the said points of said containers being equally spaced-apart; means to feed through said runway a group of as many cans as there are containers; means to stop and hold said cans simultaneously beneath said containers; means to adjust said cans in positions in which the center of each can registers with one of said points in said containers; and means to intermittently agitate said flux in said containers simultaneously.

3. In a can manipulating machine having a runway for the cans the combination of the following elements, viz: supported above said runway an even-numbered plurality of like flux-containers having downwardly delivering vents adjacent the center of the bottom of each said flux-container, the said centers being equally spaced-apart; a carrier comprising a bottom adapted to loosely carry a group of like cans each of diameter equal to the interspace between said centers; under said runway an endless conveyer on which said carrier loosely rides; means to impart to said conveyer continuous motion in parallelism with said runway; on each side of said runway parallel lateral alining members spaced and disposed to contact with some of said cans and coacting with said conveyer to guide said group toward positions in which their centers register with said centers of said bottoms of said flux containers; transverse said runway in the path of said cans a movable normally closed stop disposed to contact with some of said cans and coacting with said conveyer and said lateral members to crowd said group toward said positions; on said carrier a rear member disposed to contact with some of said cans and, coacting with said conveyer said lateral members and said stop, to ultimately force and hold said group stationary in said positions; and means to raise said stop out of the path of said cans in said runway.

4. In a can manipulating machine having a runway for the cans the combination of the following elements, viz: supported above said runway an even-numbered plurality of like flux-containers having adjacent their equally spaced apart centers downwardly delivering vents; a carrier comprising a bottom adapted to loosely carry a group of as many like cans as there are flux containers, the diameter of each said can being equal to the interspace between said centers of said flux-containers; below said runway an endless conveyer on which said carrier loosely rides; means to impart to said conveyer continuous motion in parallelism with said runway; on each side said runway parallel lateral alining members spaced apart a distance equal to the sum of the said diameters of an aliquot part of the number of said cans and disposed to contact with some of said cans and coacting with said conveyer to guide said group toward positions in which their centers register with said centers of said flux-containers; transverse said runway in the path of said cans a movable normally closed stop disposed to contact with some of said cans and coacting with said conveyer and said lateral members to crowd said group toward said positions; on said carrier a rear member disposed to contact with some of said cans and coacting with said conveyer said lateral members and said stop to ultimately force and hold said group stationary in said positions; means to intermittently agitate said flux in said containers simultaneously, and means to raise said stop out of the path of said cans in said runway.

5. In a can-manipulating machine having a horizontal runway adapted for simultaneous passage therethrough of a group of equally spaced-apart, like, cylindrical cans carrying like upwardly presented circular caps the combination of the following elements, viz: stationarily supported above said runway a group of like equally spaced-apart flux-containers each having in its bottom a plurality of downwardly-delivering like vents, movably supported within each said container a flux-agitating member comprising a vertically disposed rotatively oscillatable spindle having therefrom radially projecting arms disposed to simultaneously over-pass said vents, carried by each said spindle above said radially disposed arms a crank therefrom radially projecting in the same direction as the said cranks of the other spindles; a member pivotally connected with each said crank; and means to impart horizontal oscillation to said last mentioned member whereby the said flux-agitating members are caused to simultaneously rotatively oscillate within said flux-containers.

6. In a machine having a runway for passage therethrough, simultaneously abreast each other, of a plurality of like cans each having an upwardly presented therewith concentric like joint disposed in a circle, the following combination of elements, viz: stationarily supported above said runway means for containing flux comprising a plurality of equally spaced-apart, like, groups of downwardly-delivering vents, each of said groups disposed in a circle corresponding with said circle of said joints; movably supported within said means for containing flux a plurality of equally spaced-apart flux-agitating members each comprising a vertically disposed rotatorily oscillatable spindle concentric with one of said circles and having therefrom radially projecting arms disposed to simultaneously over-pass the said vents of one of said groups; carried by each spindle, above said radially disposed arms, a crank radially projecting therefrom in the same direction as the like cranks of the other spindles, a member pivotally connected with each said crank and means to impart horizontal oscillation to said last mentioned member whereby the said flux-agitating members are caused to simultaneously rotatively oscillate.

BERNARD HAUSHEER.

Witnesses:
DAVID F. LEE,
MARY G. LOFTUS.

Copies of this patent may be obtained for five cents each, by addressing the "Commissioner of Patents Washington, D. C."